United States Patent

Spinella et al.

(10) Patent No.: US 7,432,466 B2
(45) Date of Patent: Oct. 7, 2008

(54) METHOD OF ELECTRICAL RESISTANCE SPOT WELDING

(75) Inventors: Donald J. Spinella, Greensburg, PA (US); John R. Brockenbrough, Murrysville, PA (US); Joseph M. Fridy, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/298,216

(22) Filed: Dec. 9, 2005

(65) Prior Publication Data

US 2007/0131655 A1    Jun. 14, 2007

(51) Int. Cl.
    *B23K 11/24* (2006.01)
(52) U.S. Cl. ............... 219/110; 219/61.4; 219/119
(58) Field of Classification Search ........... 219/119, 219/110, 61.4, 69.15, 86.1, 78.01, 118, 86.16, 219/75, 86.8, 117.1, 86.51, 86.33, 86.41
    See application file for complete search history.

(56) References Cited

U.S. PATENT DOCUMENTS

| | | | | |
|---|---|---|---|---|
| 3,592,994 | A | * | 7/1971 | Ford ............... 219/89 |
| 3,689,731 | A | * | 9/1972 | Miller ............ 219/119 |
| 4,296,304 | A | * | 10/1981 | Defourny .......... 219/86.41 |
| 4,317,980 | A | * | 3/1982 | Goodrich et al. ..... 219/117.1 |
| 4,472,620 | A | * | 9/1984 | Nied ............ 219/120 |
| 4,633,054 | A | | 12/1986 | Patrick et al. |
| 4,634,829 | A | * | 1/1987 | Okabe et al. ....... 219/117.1 |
| 4,694,135 | A | * | 9/1987 | Nagel et al. ........ 219/110 |
| 4,733,042 | A | | 3/1988 | Nishiwaki et al. |
| 4,954,687 | A | | 9/1990 | Bush et al. |
| 4,972,047 | A | | 11/1990 | Puddle et al. |

(Continued)

FOREIGN PATENT DOCUMENTS

DE         19917896 A1    10/1999

(Continued)

OTHER PUBLICATIONS

Arrington, Jr., Samuel E., "Twisting Electrodes Improve Tip Life and Weld Quality on Resistance Spot Welded Aluminum Sheet", SAE Technical Paper Series 950717, Detroit, MI (1995).

(Continued)

*Primary Examiner*—Jerry Lorengo
*Assistant Examiner*—Michael Aboagye
(74) *Attorney, Agent, or Firm*—Greenberg Traurig LLP; Peter J. Borghetti

(57) ABSTRACT

A method of resistance welding comprising the steps of contacting a metal sheet with an electrode having an initial contact surface area at a force to provide a pressure to the metal sheet applying a current through the electrode to the metal sheet; measuring dimensional changes of the electrode; correlating dimensional changes in the electrode to changes in the initial contact surface area; and adjusting the force to compensate for the changes in the initial contact surface area of the electrode to maintain pressure to the metal sheet. The force may be adjusted by stepping the force to maintain pressure to the faying surface of the metal sheet to be welded. By maintaining the pressure at the faying surface the life cycle of the electrodes may be increased without forming discrepant welds. The current may also be stepped to further extend electrode life.

22 Claims, 12 Drawing Sheets

U.S. PATENT DOCUMENTS

| | | | |
|---|---|---|---|
| 5,302,797 | A | 4/1994 | Yasuyama et al. |
| 5,395,687 | A | 3/1995 | Totsuka et al. |
| 5,409,156 | A | 4/1995 | Tsuji et al. |
| 5,449,878 | A | 9/1995 | Beneteau et al. |
| 5,504,299 | A * | 4/1996 | Heckendorn ................ 219/109 |
| 5,541,382 | A | 7/1996 | Taylor et al. |
| 5,789,719 | A * | 8/1998 | Pary et al. ................ 219/86.25 |
| 5,906,755 | A * | 5/1999 | Arasuna et al. .......... 219/86.41 |
| 6,054,668 | A | 4/2000 | Van Otteren et al. |
| 6,198,071 | B1 * | 3/2001 | Kitsunai ................ 219/130.01 |
| 6,342,686 | B1 * | 1/2002 | Farrow ...................... 219/109 |
| 6,403,913 | B1 | 6/2002 | Spinella et al. |
| 6,646,221 | B2 | 11/2003 | Wang et al. |
| 2002/0053555 | A1 | 5/2002 | Matsuyama |
| 2005/0045597 | A1 * | 3/2005 | Wang et al. ................ 219/110 |

FOREIGN PATENT DOCUMENTS

JP       06-007954    *   5/1992

OTHER PUBLICATIONS

Ashton, R.F. & Rager, D.D., "An Arc-Cleaning Approach For Resistance Welding Aluminum", Welding Journal 55 (9): pp. 750 to 757 (1976).

Boomer, D.R., Hunter, J.A., and Castle, D.R., "A New Approach For Robust High-Productivity Resistance Spot Welding of Aluminum", SAE Technical Paper 2003-01-0575, Detroit, MI (2003).

Saunders, H.L., Chapter 14 "Resistance Welding", pp. 14.1-14.13, The Aluminum Association, Welding Aluminum: Theory and Practice, Fourth Edition (2002).

Spinella, D.J. et al: "Trends in Aluminum Resistance Spot Welding for the Auto Industry", Welding Journal, American Welding Society, Miami, FL, US; vol. 84, No. 1, Jan. 2005, pp. 34-40.

Fukomoto, S. et al: "Effects of Electrode Degradation on Electrode Life in Resistance Spot Welding of Aluminum Alloy 5182", Welding Journal, American Welding Society, Miami, FL, US, vol. 82, No. 11, Nov. 2003, pp. 307-312.

* cited by examiner

| WELD NUMBER | FORCE (kN) | CURRENT (kA RMS) |
|---|---|---|
| 100 | 2.67 | 24.0 |
| 200 | 2.74 | 24.6 |
| 300 | 2.81 | 25.2 |
| 400 | 2.88 | 25.9 |
| 500 | 2.95 | 26.5 |
| 600 | 3.02 | 27.1 |
| 700 | 3.08 | 27.7 |
| 800 | 3.16 | 28.3 |
| 900 | 3.22 | 29.0 |
| 1000 | 3.29 | 29.6 |
| 1100 | 3.36 | 30.2 |
| 1200 | 3.43 | 30.8 |
| 1300 | 3.50 | 31.5 |
| 1400 | 3.57 | 32.1 |
| 1500 | 3.64 | 32.7 |
| 1600 | 3.71 | 33.3 |
| 1700 | 3.77 | 33.9 |
| 1800 | 3.84 | 34.6 |
| 1900 | 3.91 | 35.2 |
| 2000 | 3.98 | 35.8 |
| 2100 | 4.05 | 36.4 |
| 2200 | 4.12 | 37.0 |
| 2300 | 4.19 | 37.7 |
| 2400 | 4.26 | 38.2 |

*FIG.11*

METHOD OF ELECTRICAL RESISTANCE SPOT WELDING

FIELD OF THE INVENTION

The present invention relates to an electrical resistance welding method. More specifically, an electrical resistance welding process is provided that adjusts the force applied to the electrodes to correspond to dimensional changes in the electrode cross-section. By measuring the dimensional changes of the electrodes cross-section and adjusting the force applied to the electrodes to correspond to the dimensional changes in the electrode the welding process lifetime can be increased without degrading welding performance.

BACKGROUND OF THE INVENTION

Resistance spot welding of aluminum processes traditionally has a lower electrode life than gauged steel and coated steel resistance welding methods. Increased electrode life is desired because it reduces maintenance cost; increases weld quality, and most importantly yields higher production. One disadvantage of resistance welding of aluminum is erosion of the electrodes, which results in changes of the tip geometry of the electrode contact surfaces. Changes in electrode tip geometry causes irregulars in pressure and current distribution at the faying surface of the welded metal sheets throughout the life cycle of the welding process and eventually results in insufficient or discrepant welds. One example of a discrepant weld obtained during peel testing is depicted in FIG. 1.

Prior methods to increase the life cycle of resistance spot welding of aluminum modify the contact resistance of the aluminum welding surfaces either through mechanical and/or chemical means. A few examples include: twisting electrodes, arc cleaning the aluminum sheet's surface, and differential surface treatments. While these techniques can enhance performance, they are not easily incorporated into existing resistance spot welding processes and disadvantageously increase process cost.

Another method of increasing the life cycle of the electrodes in resistance spot welding is current stepping. Current stepping is the increase of current to compensate for the increase in surface area of the electrode contact surface due to erosion. Typically, current stepping is programmed by the user in increments of welds performed. For example, welds 1-100 being conducted at 24.0 kA and welds 10-200 being conducted at 25.0 kA.

Additionally, the lifecycle of resistance spot welding of aluminum metal may be increased by mechanically polishing electrodes at a frequency of about 14-20 welds between polishing. In this method, the tool and abrading medium, such as sandpaper, scotchbrite or cutting tools, are placed between the electrodes under low pressure and rotated until the intermetallic that is produced on the electrode tip during electrode erosion is removed. Similar to the above-described prior solutions to increasing the life cycle of resistance welding, mechanical polishing of electrodes is not easily incorporated into existing processes and disadvantageously increases production cost.

U.S. Patent Application Publication 2005/0045597 A1, entitled "Resistance Welding Control Method", to Wang et al. ("Wang et al.") describes one prior method of monitoring weld quality in resistance welding. Wang et al. disclose that weld quality may be monitored by measuring dimensional changes in the weld indentation at the welding surface. Wang et al. further discloses that weld quality may be improved by varying the welding current in response to dimensional changes in the weld indentation of the welding process. Similar to other conventional welding processes, Wang et al. do not measure dimensional changes in the electrode due to electrode erosion. Further, Wang et al. do not correlate dimensional changes in eroding electrodes to irregulars in pressure at the faying surface of metal sheets throughout the welding process.

What is needed is a method of resistance welding that increases electrode lifetime without substantially increasing production cost.

SUMMARY OF THE INVENTION

One aspect of the present invention is an improved method of resistance spot welding that does not require significant modification to existing resistance welding processes. Another aspect of the present invention provides a means of increasing electrode lifetime by maintaining the pressure applied to the welding surface during the lifetime of the electrode.

Over the service lifetime of the welding electrodes in electrical resistance welding, the contact surfaces of the electrode erode in response to the high currents required to weld low resistance metals. Erosion of the electrode tip (contact surface) creates an increased contact surface that distributes the force applied to surface to be welded over a greater area. By distributing the force over a greater area, the pressure at the faying surface is decreased resulting in insufficient or discrepant welds. The present invention increases the service life of electrodes and decreases the incidence of discrepant welds by an inventive welding method that comprises the steps of:

contacting a metal sheet with at least one electrode having an initial contact surface area at a force to provide a pressure to said metal sheet; applying a current through said at least one electrode to said metal sheet; measuring dimensional changes of said at least one electrode; correlating said dimensional changes in said at least one electrode to changes in said initial contact surface area; and adjusting said force to compensate for said changes in said initial contact surface area of said at least one electrode to maintain said pressure to said metal sheet.

In one embodiment of the present invention, dimensional changes of the electrode are measured by correlating changes in stroke dimension to changes in the contact surface area of the tip of the electrode. The stroke dimension is defined as the distance of travel the electrode is actuated prior to current application. More specifically, the stroke dimension is equal to the difference in the electrode starting position and the position of the electrode when the electrode tip makes initial contact to the surface of the metal sheet. A mathematical algorithm correlates the changes in stroke dimension throughout the welding lifecycle to changes in the surface area of the electrode contact surface resulting from electrode erosion. In one embodiment, the mathematical algorithm is a function of the type of electrode geometry being employed.

In another embodiment of the present invention, changes in the surface area of the tip of the electrode may be determined by optical, laser, and mechanical measurements of the contact surface of the electrode. Optical, laser, and mechanical measurements of the impression of the electrode formed on the metal sheets may also provide dimensional changes in the electrode. Alternatively, dimensional changes in the electrode contact surface area may be determined by making an impression of the contact surface of the electrode tip on a work piece separate from the metal sheet and measuring the dimensions of the impression, such as the impression's diameter.

In another embodiment of the present invention, changes in the surface area of the tip of the electrode may be determined by an off-line pressure transduce to monitor the amount of force required to maintain within a certain force window.

Once the changes in the electrode contact surface area are determined, the current and/or electrode force is stepped to compensate for the decrease in pressure at the faying surface that results from the increased contact surface area of the eroded electrode.

BRIEF DESCRIPTION OF THE DRAWING

FIG. 11 depicts a table illustrating current and force stepping.

DETAILED DESCRIPTION OF PREFERRED EMBODIMENTS

Figure 1:
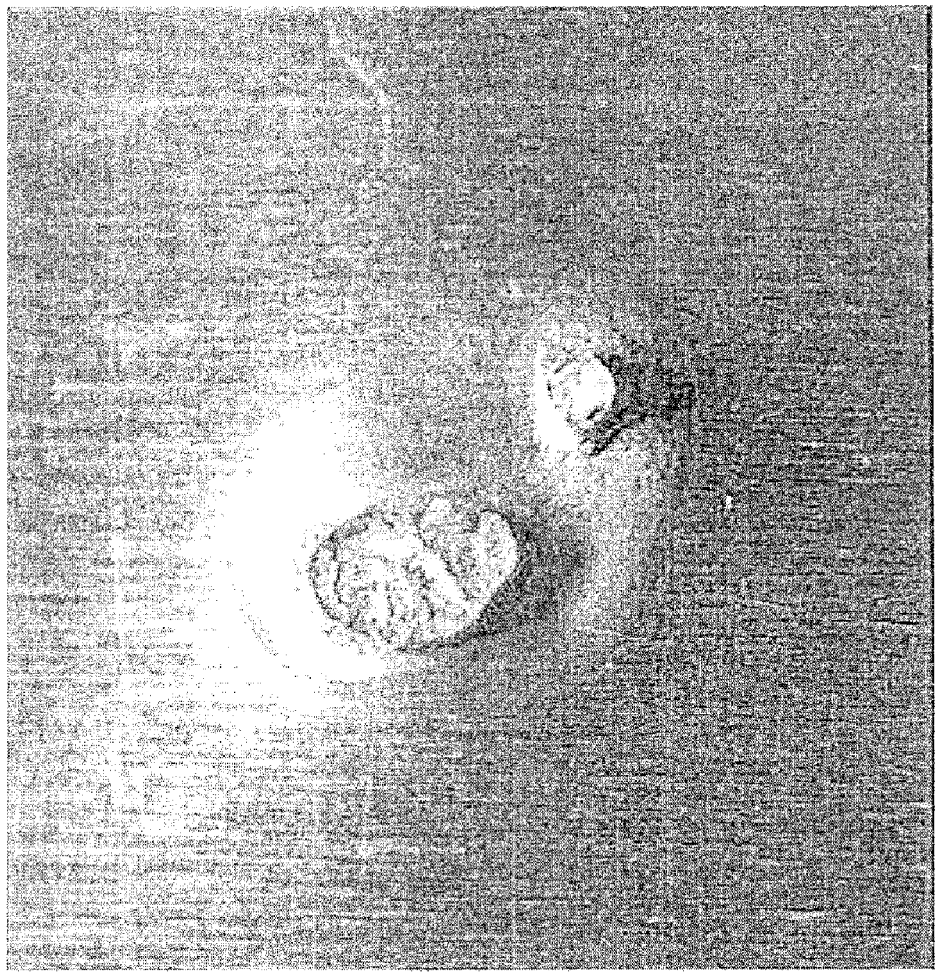
FIG. 1 illustrates a discrepant weld following peel testing.

In one embodiment, the present invention provides a resistance welding method that maintains constant pressure at the faying surface of a welded aluminum sheet by compensating for the changing dimensions in the contact surface of the eroding electrode by proportionally increasing the electrode force. In another embodiment of the present invention, a resistance welding method is provided in which the pressure to the faying surface is maintained above a threshold pressure and within a preselected range of pressures. The present invention is now discussed in more detail referring to the drawings that accompany the present application. It is noted that in the accompanied drawings, like and/or corresponding elements are referred to by like reference numbers.

Figure 2:
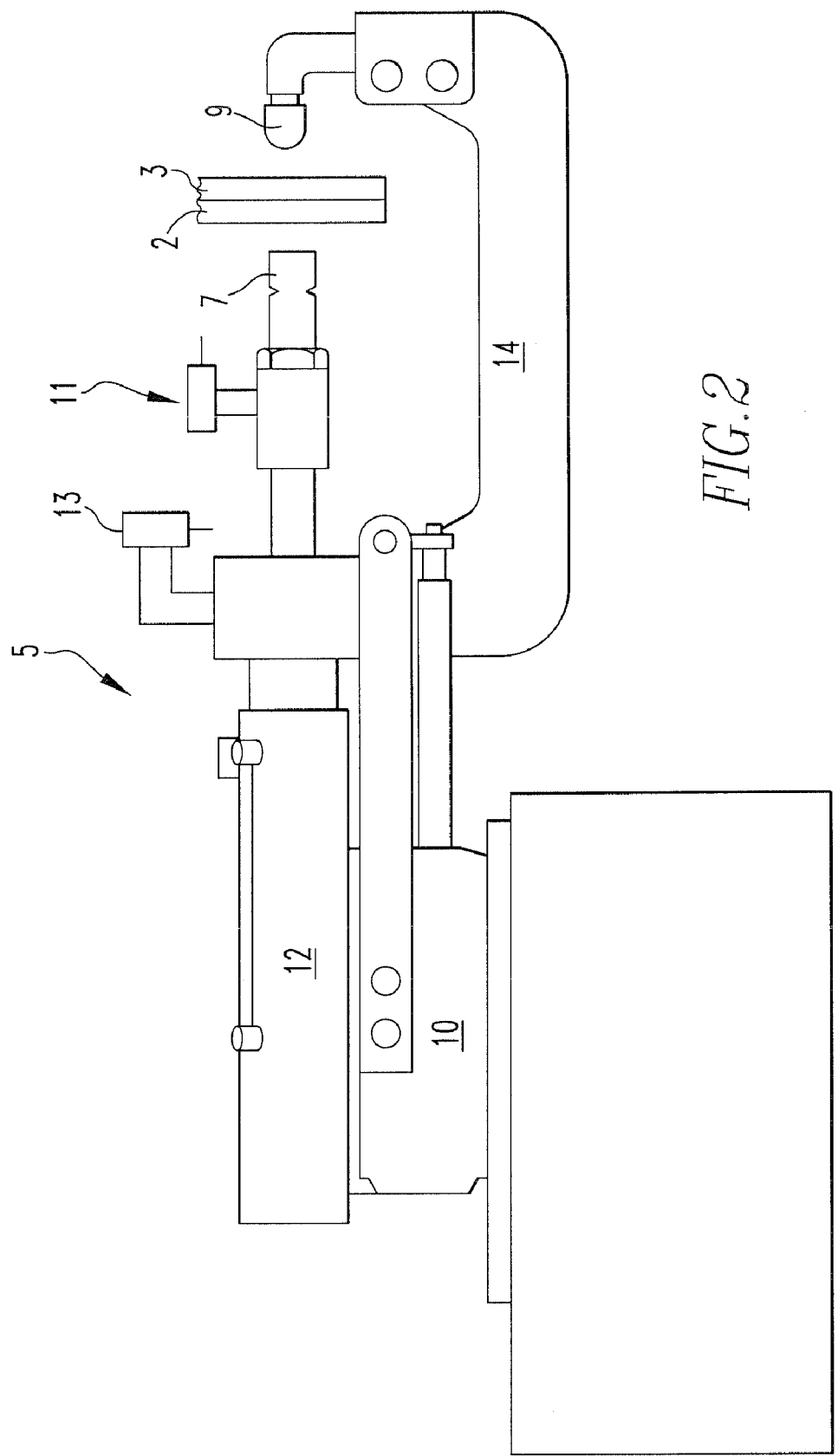
FIG. 2 (three dimensional view) illustrates a resistance welding apparatus.

One example of a resistance welding apparatus is depicted in FIG. 2. The resistance welding apparatus 5 comprises a first electrode 7 positioned to contact a surface of a first metal sheet 2 during current and force application and a second electrode 9 positioned to contact a surface of a second metal sheet 3. The resistance welding apparatus may be orientated so that the first electrode 7 is the upper electrode and the second electrode 9 is the lower electrode. Regardless of orientation, the electrodes are axially aligned in opposition to each other. A large electric current is momentarily passed between the opposing electrodes through the first and at least one other resistive metal sheet that are pressed between them. The sheet metal between the electrodes is briefly fused during current flow and then re-solidified to form an integral weld at the faying surface between the first and second metal sheets 2, 13. Although a first and second metal sheet 2, 3 is referred to throughout the present disclosure, it is noted that any number of metal sheets may be welded together, such as three metal sheets.

The electrodes utilized in resistance welding may be formed of a material selected from the group consisting of copper based alloys, refractory metals, and dispersion-strengthened copper alloys. The geometry of the electrode may include any geometry consistent with American Welding Society (AWS) standards as listed in the *Recommended Practices for Resistance Welding*. See AWS C1.1M/C1.1:2000. Preferably, the electrode geometry may comprise pointed (AWS Type A), dome (AWS Type B), flat (AWS Type C), offset (AWS Type D), truncated (AWS Type E) or radius (AWS Type F).

Electrode erosion occurs in resistance welding of low resistance metals due to the high current required to weld low resistance metals. The term "low resistance metals" denotes metals having a sheet resistance on the order of about $1.6 \times 10^{-8} \Omega \cdot m$ (silver) to about $10 \times 10^{-8} \Omega \cdot m$ (steel/iron). One preferred low resistance metal is aluminum having a sheet resistance on the order of about $2.8 \times 10^{-8} \Omega \cdot m$ (aluminum). The term "high current" denotes a current on the order of about 5,000 Amps to about 100,000 Amps. Although voltage may be adjusted depending on secondary size, in one embodiment the voltage may be on the order of less than 1 volt. Although resistance welding of aluminum is the preferred application, the method is equally applicable to other metals, such as magnesium or steels, including low carbon, high strength, dual-phase (DP), transformation induced plasticity (TRIP), and stainless steel. The current applied to welding steel by resistance welding preferably ranges from about 5,000 Amps to about 35,000 Amps, in which the voltage measured at each of the electrode tips may be on the order of less than 1 volt. The weld joint will consist of two or more sheets of similar materials with individual gauges ranging between 0.25 mm to 4.00 mm.

During high current resistance welding, one mechanism of electrode erosion includes the formation of an intermetallic at the contact surface of the electrode. Intermetallics are formed at the electrode tips by deposition of material from the contact surface of the welded material onto the electrode contact surface. When Cu electrodes are applied to welding sheets of Al, the intermetallics typically comprise Cu and Al. The effects of electrode erosion are depicted in FIG. 3.

Figure 3:
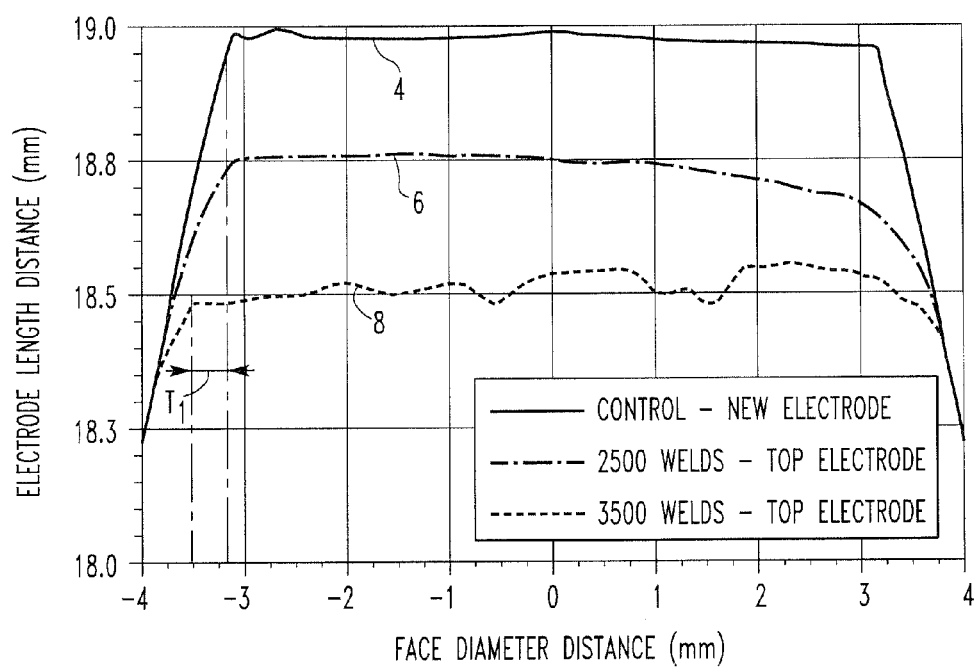
FIG. 3 is a plot of electrode length (mm) vs. electrode face diameter distance (mm) for an electrode utilized to provide 2,500 welds, an electrode utilized to provide 3,500 welds, and a new electrode.

FIG. 3 is a plot that represents the side profile of electrodes that have been used for 2500 welds and 3500 welds. FIG. 3 also includes a control data line to represent a new electrode. The y-axis of the plot represents the length of the electrode from the electrodes base to the contact surface of the electrode. The x-axis represents the width of the electrode contact surface, wherein 0.0 mm represents the center of the electrodes contact surface diameter. The welds where conducted on 6111T-4 aluminum having a thickness on the order of about 1.0 mm.

Comparing the data lines for the electrode subjected to 3500 welds (indicated by reference number 8); the data line for the electrode subjected to 2500 welds (indicated by reference number 6); and the control electrode (indicated by reference number 4) clearly illustrates the effects of erosion during the life cycle of the electrodes in resistance welding. More specifically, comparing the electrode that had been subjected to 3500 welds to the control electrode indicates that the length of the electrode has decreased from approximately 19.0 mm to approximately 18.5 mm. More importantly, the difference in electrode contact diameter $T_1$ between the electrode subjected to 3500 welds and the control electrode is greater than 1.0 mm. As discussed above, the increased surface area disadvantageously distributes the force applied through the electrode to a larger contact surface of the metal sheet, effectively distributing the force over a greater area and resulting in a decrease of pressure at the faying surface.

Figure 4:
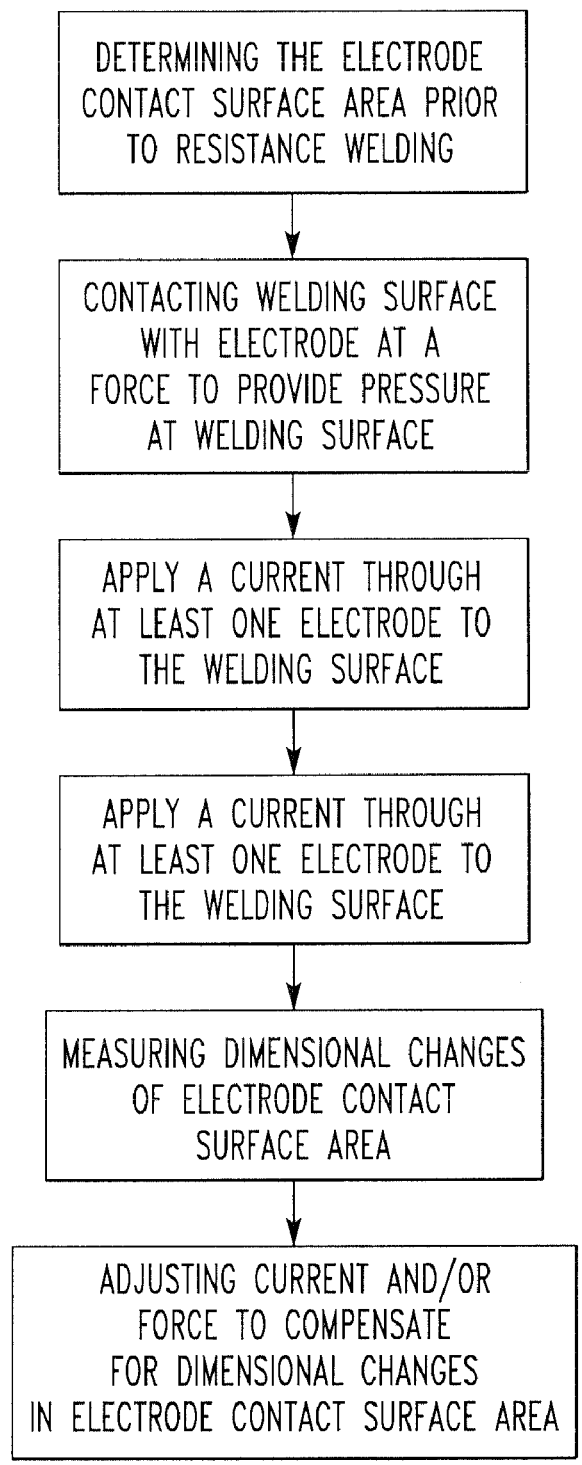
FIG. 4 is a flow chart of the process steps for the inventive method of resistance welding.

Referring to FIG. 4, the present invention overcomes the disadvantages of the prior art by a method that maintains pressure at the faying surface of the welding material by adjusting the electrode force to correspond to changes in the electrode contact surface area. The inventive method begins with measuring or programming the initial electrode contact surface area prior to resistance welding. In one embodiment, as opposed to first measuring the diameter of the electrode, the equipment operator could enter the size into the weld controller at the start of each tip replacement. The metal sheet is then contacted with an electrode having a first contact surface area at a force to provide a pressure to the metal sheet and a current is momentarily applied current through the electrode to the metal sheet to form a weld. In a next process step, changes in the contact surface area of the electrode due to erosion are measured. Finally, the electrode force is adjusted to correspond to the changes in the electrode contact surface area in order to maintain pressure to the metal sheet.

In one embodiment of the present invention, changes in surface area of the electrode tip is determined by measuring dimensional changes in the stroke of the resistance welding apparatus arm, which applies the electrode to the metal sheet surface to be welded.

Figure 5A:
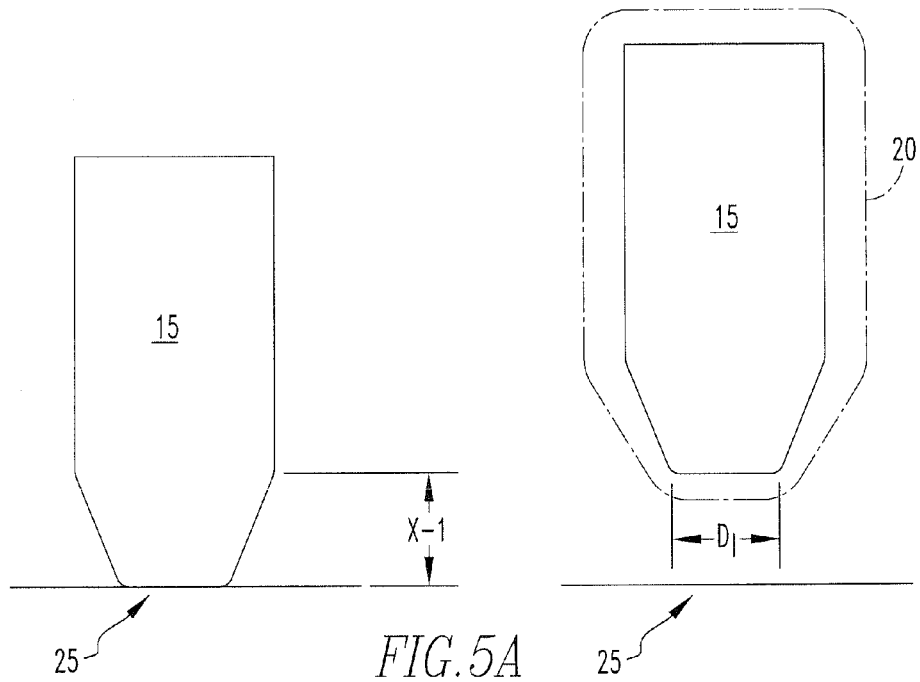
FIGS. 5(a)-(c) (side view) illustrate the relationship between dimensional changes in the stroke dimension and electrode contact surface diameter.
Figure 5B:
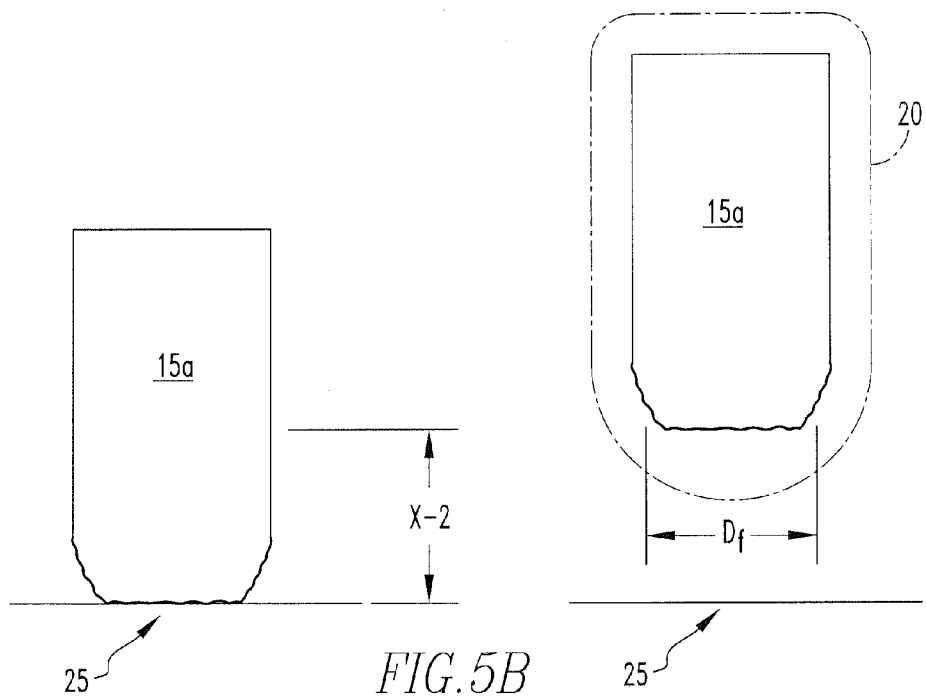
Figure 5C:
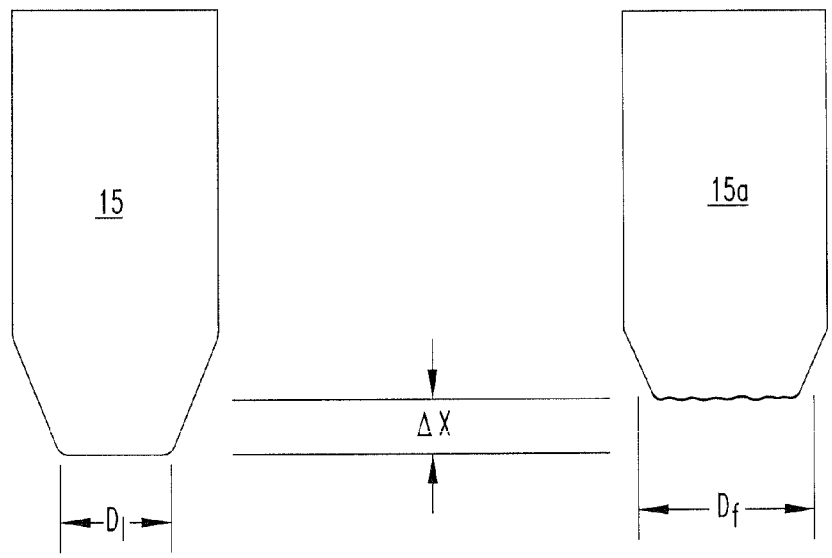

Referring to FIGS. 5(*a*) and 5(*b*), the stroke dimension $X_1$, $X_2$ represents the distance the electrode 15, 15*a* travels between the electrodes starting position 20 and the positioning of the electrode 15 at the faying surface 25 prior to current application. FIG. 5(*a*) depicts the initial stroke dimension $X_1$ of an electrode prior to erosion. FIG. 5(*b*) depicts the stroke dimension $X_2$ of the electrode 15*a* following erosion of the electrode tip, wherein the stroke dimension $X_2$ following erosion is greater than the original stroke dimension $X_1$. Referring to FIG. 5(*c*), the change in stroke dimension is equal to the difference in the initial stroke dimension $X_1$ and the stroke dimension following electrode erosion, $X_2$ in which the change in stroke dimension is equal to the dimensional change in length of the eroded electrode tip ($\Delta X$).

Referring to FIG. 2, in one embodiment of the present invention, changes in the stroke dimension are measured by a cylinder 12, such as pneumatic, electro-servo, air over oil or hydraulic cylinders, which actuate the electrode 9 to contact the metal sheet 3. In this embodiment, the pneumatic, electro-servo or hydraulic cylinders are adapted to measure the stroke dimension for each weld, wherein the stroke dimension for each weld is compared to an initial stroke dimension that was obtained prior to any erosion of the electrode.

Alternatively, dimensional changes in the stroke dimension may be measured using optical, laser, and mechanical measurements of the distance to the contact surface taken from sensors 11 in close proximity to the electrode tip 7. Alternatively, sensors may be mounted in the welding cylinder 12. The sensors may be external or integrally combined with the cylinders 12. In one embodiment, the sensor 13 may be mounted to measure the movement of the shank 14 that supports the electrode 9.

Referring to FIGS. 5*a* and 5*b*, the change is stroke dimension (dimensional change in the length of the eroded electrode tip ($\Delta X$)) due to electrode erosion is incorporated into a mathematical algorithm to determine the change in surface area of the eroded electrode contact surface, wherein the diameter of the electrode contact surface following electrode erosion $D_f$ is typically greater than the diameter of the electrode contact surface prior to erosion $D_i$.

One example of an algorithm that correlates dimensional changes in stroke dimension (dimensional change in the length of the eroded electrode tip ($\Delta X$)) to increases in electrode contact surface area is the following:

$$D_f \text{ to } D_i \text{ area ratio} = 0.0977(\Delta X^2) + 0.625(\Delta X) + 1.0$$

$D_i$=initial diameter of the electrode tip of new or dressed electrode
$D_f$=diameter of the eroded electrode tip
$\Delta X$=difference in stroke dimension The above equation assumes a 45 degree truncated (AWS Type E) electrode. The initial diameter $D_i$ is obtained when a new electrode is placed into the weld station or an electrode dressing operation refaces the electrode. The above equation has been provided for illustrative purposes only and is not intended to limit the invention.

Figure 6:
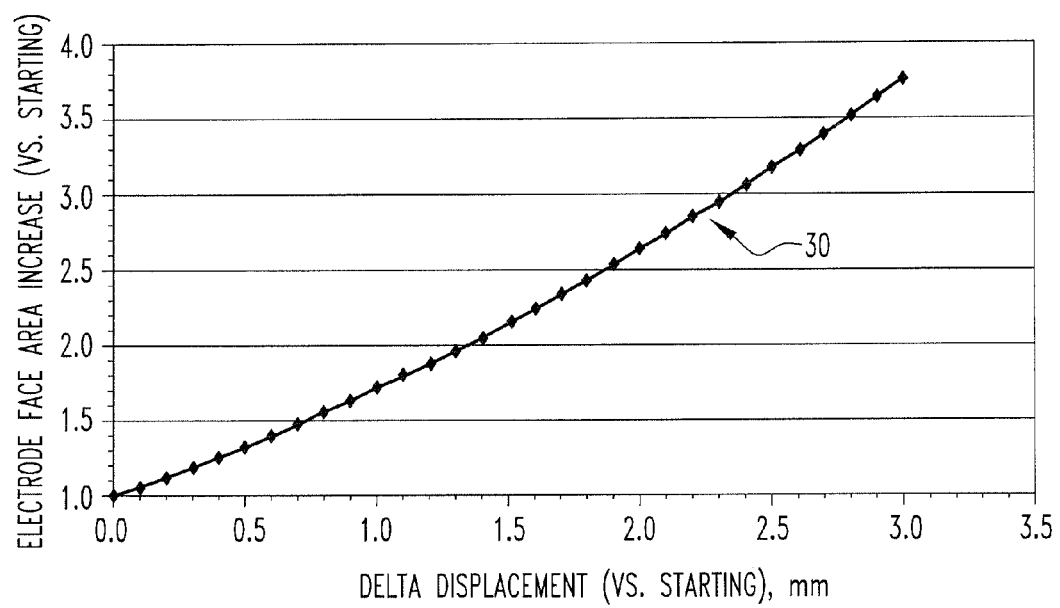
FIG. 6 is a plot that illustrates the relationship between stroke dimension and electrode contact surface area for an eroding electrode.

Using the above equation, changes in the surface area of a 45 degree truncated (AWS Type E) electrode can be computed to correspond to the changes in the stroke dimension $\Delta X$. Referring now to data line 30 in FIG. 6, which depicts a plot of the surface area of the electrode contact surface vs. the change in stroke dimension resulting from electrode erosion, it is noted that as the stroke dimension increases the surface area of the electrode tip increases as well. By determining the increase in the surface area of the electrode tip, the current and/or force applied to the electrode can then be stepped to compensate for the increase in surface area and decrease in applied pressure.

Figure 7:
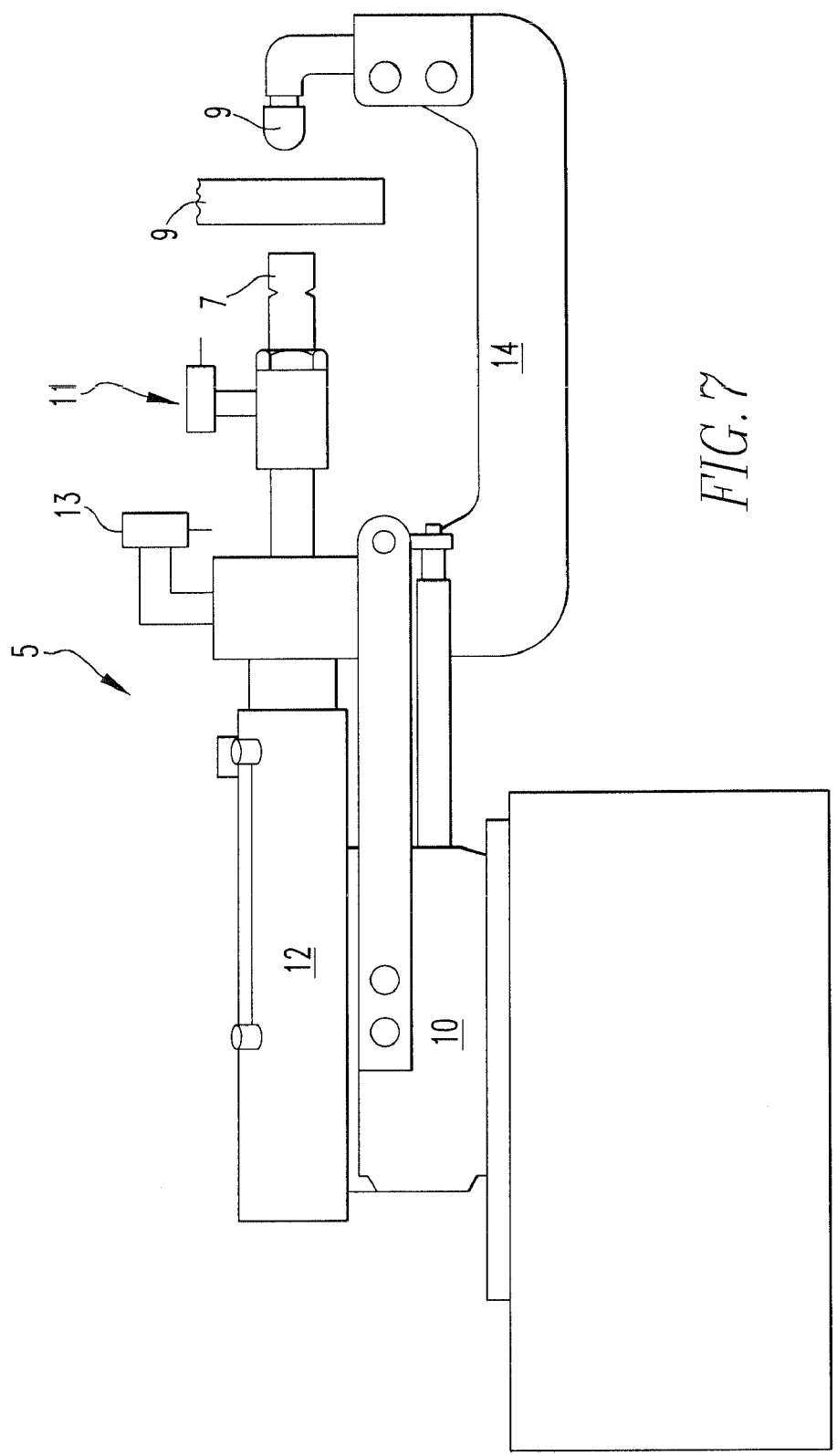
FIG. 7 depicts one embodiment of the present invention in which the electrode contact surface is measured by a pressure sensitive pad.

In another embodiment, the surface area of the electrode contact surface is directly measured using optical methods. In a further embodiment of the present invention, the surface area of the electrode tip is determined by making an impression of the electrode contact surface on a work piece separate from the welded metal sheets and then measuring the changes in the electrode contact surface from the impression on the workpiece. Referring to FIG. 7, in another embodiment, the surface area of the electrode contact surface 7, 9 is measured by contacting the electrode contact surface 7, 9 to a pressure sensitive pad 16, which can then provide feedback to the weld controller.

Once the surface area changes of the electrode contact surface are measured, the force applied to the metal sheet through the electrode and/or the current applied to the metal sheet is stepped to compensate for the increasing surface area of the electrode tip. The increasing surface area of the electrode contact surface disadvantageously distributes the force applied through the electrode to a larger surface of the metal sheet resulting in a decrease of applied pressure to the faying surface. Therefore, in order to maintain the optimum pressure at the faying surface the electrode face must be stepped to compensate for the increasing surface area of the eroding electrode tip.

Stepping is a process where the force is incrementally increased to maintain a desired pressure at the faying surface during the welding process. The step increment correlates to increases in electrode contact surface area. This value can be calculated for each welding operation or periodically after a specified number of operations. The calculation can be performed before, during or after the welding operations. Additionally, the current may also be stepped to further increase the electrode lifetime prior to forming discrepant welds. After the step value is obtained, subsequent welds may have the current and force setpoint values changed according to the user's preference. Critical processes may change the force and current values to maintain the original current density and pressure. Less sensitive applications may change the force and current values such that the current density and pressure do not fall below a predefined level.

Figure 6A:
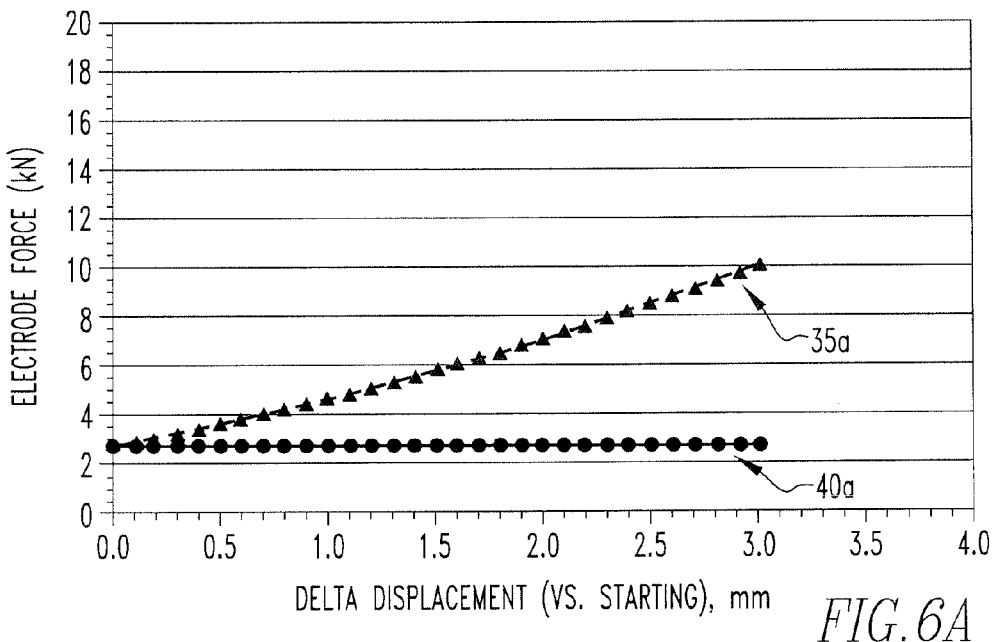
FIG. 6(a) is a plot of electrode force vs. changes in stroke dimension, in which one data line maintains a constant electrode force and a second data line incrementally increases (steps) the electrode force.
Figure 6B:
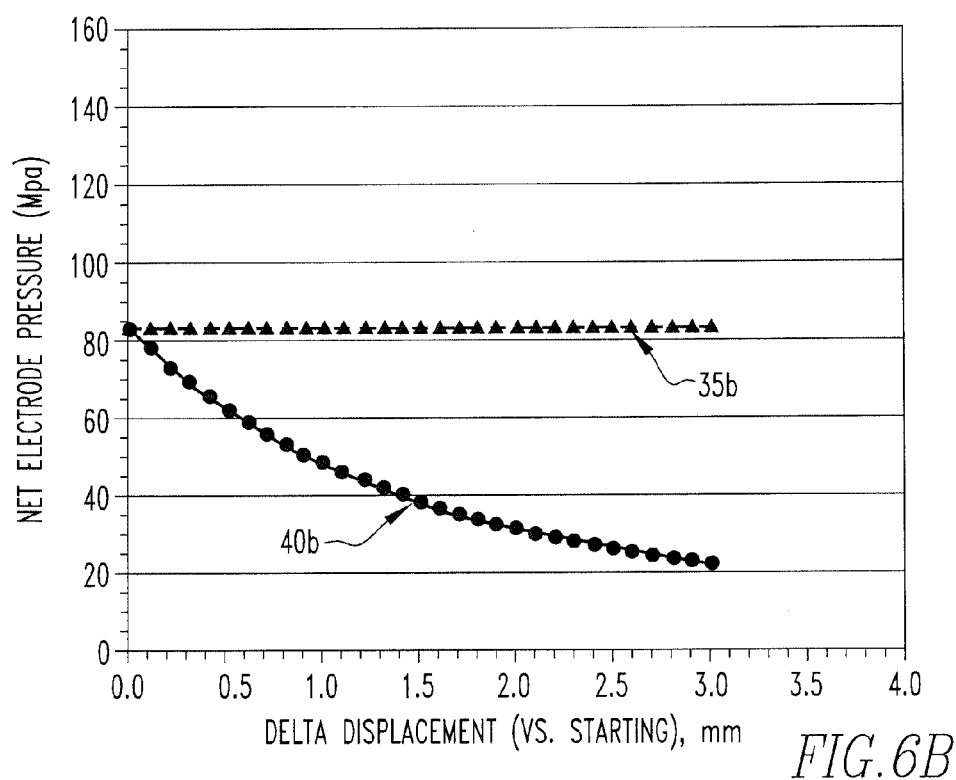
FIG. 6(b) is a plot that depicts the pressure produced at the faying surface by electrodes that apply a constant electrode force and electrodes that apply an increasing electrode force (depicted in FIG. 6(a)).

It is noted that force and current may be stepped either together or independently. The effects of stepping electrode force is illustrated in FIGS. 6(a) and 6(b). FIG. 6(a) is a plot the electrode force vs. changes in the stroke dimension, wherein data line 40a represents a constant electrode force and data line 35a represents stepping of the electrode force. FIG. 6(b) is a plot of the pressure produced at the faying surface of the welded material vs. the change in stroke dimension by the electrode applying a constant electrode force (data line 40b) and by an electrode applying a stepped electrode force (data line 35b). Still referring to FIG. 6(b), it is noted that when the electrode force is constant and the stroke dimension increases the pressure applied to the faying surface decreases. Stepping the electrode force to compensate for the increases in stroke dimension serves to stabilize the pressure applied to the faying surface, as indicated by data line 35b. By stabilizing the pressure at the faying surface the life cycle of the electrodes may be increased and the incidence of discrepant welds decreased.

Figure 8:
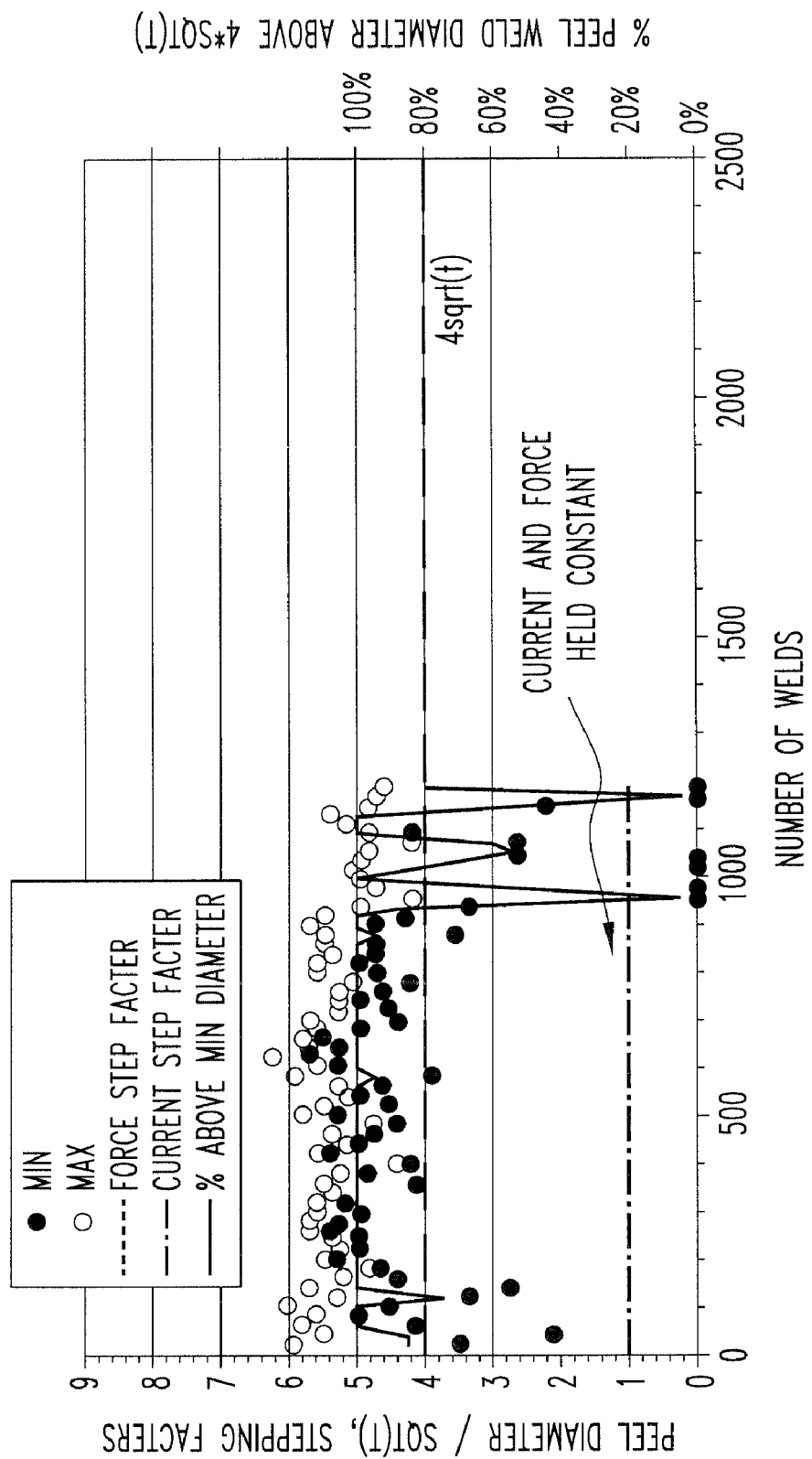
FIG. 8 depicts a plot of the number of welds performed vs. the peel diameter of the welds produced for a resistance welding process, wherein the electrode force and the current is constant.
Figure 9:
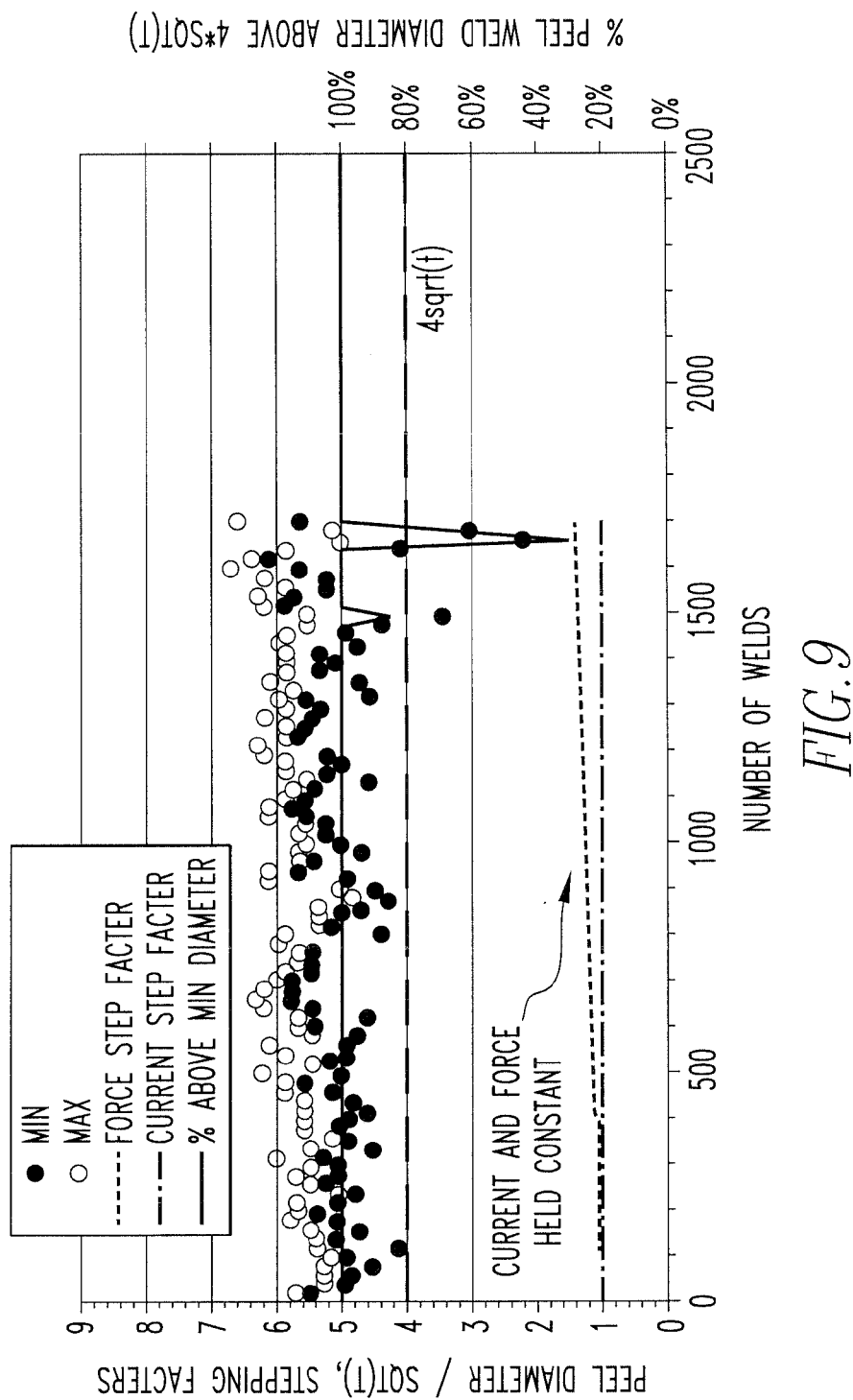
FIG. 9 depicts a plot of the number of welds performed vs. the peel diameter of the welds produced for a resistance welding process, wherein the current applied through the electrode is incrementally stepped.
Figure 10:
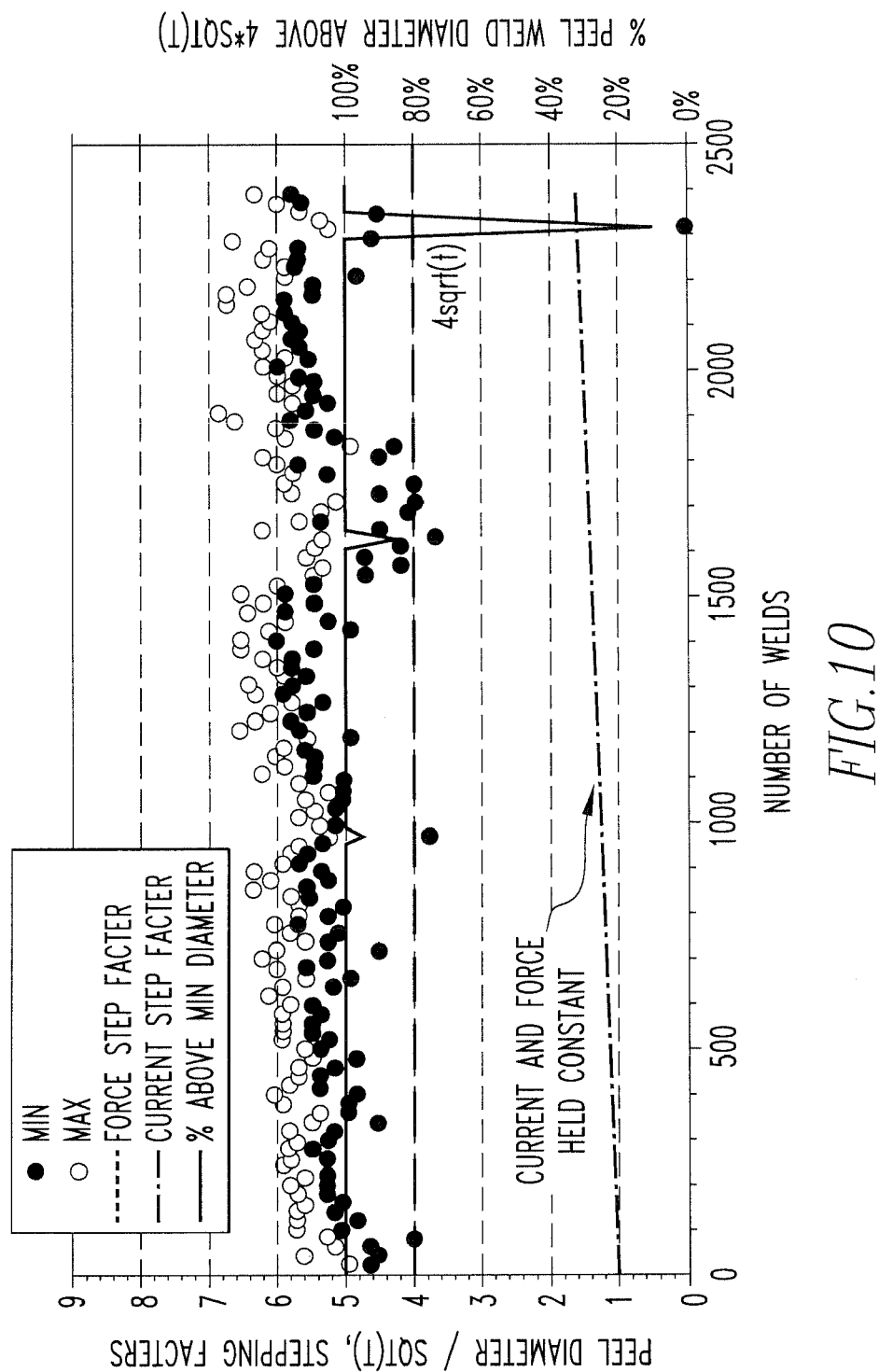
FIG. 10 depicts a plot of the number of welds performed vs. the peel diameter of the welds produced for a resistance welding process, wherein the electrode force and the current applied through the electrode is incrementally stepped.

The advantages of stepping the force to correspond to changes in the surface area of the electrodes are best described with reference to FIGS. 8-10. FIGS. 8-10 depict plots of the number of welds vs. peel diameter/sqrt(t), wherein a discrepant weld is formed when the peel diameter/sqrt(t) drops to a value on the order of about 4.0 (mm)^0.5 or less. The peel diameter/sqrt(t) represents normalized data for the peel diameter, in which discrepant welds are created when the weld diameter is not greater than four multiplied by the square root of the thickness of the sheet (sheet guage) being welded. For example, in the data provided in FIGS. 8-10, in which the thickness of the sheets being welded is 1.0 mm, discrepent welds are formed when the weld diameter is less than 1.0 mm.

FIG. 8 is a plot of the number of welds performed vs. the peel diameter of the welds produced for a resistance welding process, in which the electrode force and the current is held constant throughout the life cycle of the electrode. FIG. 8 clearly depicts that the peel diameter decreases to a level that would produce discrepant welds at approximately 900 welds.

FIG. 9 is a plot of the number of welds performed vs. the peel diameter of the welds produced for a resistance welding process in which the current applied through the electrode is incrementally stepped during the life cycle of the electrode. FIG. 9 clearly discloses that by stepping the current to correspond to electrode erosion the life cycle of the electrodes may be increased to greater than 1600 welds without forming discrepant welds.

FIG. 10 is a plot of the number of welds performed vs. the peel diameter of the welds produced for a resistance welding process in which the electrode force and the current applied through the electrode is incrementally stepped during the life cycle of the electrode. FIG. 10 clearly discloses that by stepping the force and the current to correspond to electrode erosion the life cycle of the electrodes may be increased to greater than about 2300 welds without forming discrepant welds. An example of stepping the electrode current and electrode force is provided in the table depicted in FIG. 11.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of welding comprising:

contacting a metal sheet with at least one electrode having a first contact surface area at a force to provide a pressure to a contact surface of the metal sheet, wherein the first contact surface area has a starting position displaced from the contact surface by a stroke dimension, wherein the stroke dimension is equal to a difference in the starting position and a position of the electrode tip when the electrode tip makes contact to the contact surface of the metal sheet;

applying a current through the at least one electrode to the metal sheet;

measuring a dimensional change of the stroke dimension;

correlating the dimensional change in the stroke dimension to the change in the first contact surface area of the at least one electrode using a mathematical algorithm, $$D_2 \text{ to } D_1 \text{ area ratio} = 0.0977(\Delta X^2) + 0.625(\Delta X) + 1.0$$

wherein $D_1$ is equal to a first diameter of an electrode tip of the at least one electrode, $D_2$ is equal to a second diameter of the electrode tip of the at least one electrode, $\Delta X$ is equal to the dimensional chance of the stroke dimension, and the at least one electrode has a 45 degree truncated electrode tip geometry; and adjusting the force to compensate for the dimensional change in the first contact surface area of the at least one electrode to maintain the pressure applied to the contact surface of the metal sheet.

2. The method of claim 1 wherein the at least one electrode comprises a copper based alloy, refractory metal, or dispersion strengthened copper alloy.

3. The method of claim 1 wherein the at least one electrode has an electrode tip geometry having a pointed contact surface, a dome contact surface, a flat contact surface, or a truncated contact surface.

4. The method of claim 2 wherein the metal sheet comprises aluminum, magnesium, or steel.

5. The method of claim 1 wherein the current ranges from about 5,000 amps to about 100,000 amps, wherein the metal sheet comprises aluminum or magnesium.

6. The method of claim 1 wherein the current ranges from about 5,000 amps to about 35,000 amps, wherein the metal sheet comprises steel.

7. The method of claim 1 wherein the measuring dimensional change in the stroke dimension is achieved by a sensor adjacent to the at least one electrode.

8. The method of claim 1 wherein the measuring dimensional change in the stroke dimension is achieved by a sensor integrated into a welding cylinder.

9. The method of claim 1 wherein the at least one electrode is actuated to contact the sheet metal by a hydraulic, electric servo, air over oil or pneumatic cylinder, the hydraulic, electric servo or pneumatic cylinder adapted to measure the dimensional change of the stroke dimension.

10. The method of claim 1 wherein the measuring dimensional change of the at least one electrode comprises measuring dimensional change of an electrode tip surface of the at least one electrode by optical, laser, and mechanical measurements.

11. The method of claim 1 wherein the measuring dimensional change in the at least one electrode comprises making an impression of an electrode tip surface of the at least one electrode on a work piece and measuring the impression.

12. The method of claim 1 wherein further comprising redressing the at least one electrode having the dimensional change to restore the first contact surface area.

13. The method of claim 1 wherein the electrode has a nose having a truncated, dome, or nose profile.

14. The method of claim 1 wherein the measuring dimensional change of the at least one electrode comprises contacting the electrode to a pressure pad.

15. The method of claim 1 wherein the force ranges from 30 MPa to about 200 MPa.

16. The method of claim 1 wherein the at least one electrode has an electrode with a diameter ranging from about 3.2 mm to about 19 mm.

17. The method of claim 1 wherein adjusting the force comprises incrementally stepping the force to correspond to the change in electrode contact surface during a service life of the at least one electrode.

18. The method of claim 1 wherein the current is stepped to correspond to the change in the contact surface area of the at least one electrode.

19. The method of claim 1 where the at least one electrode comprises an upper electrode positioned to contact an upper surface of the metal sheet during the applying the current and an lower electrode positioned to contact a lower surface of the metal sheet during the applying the current.

20. A method of electrical resistance welding a metal sheet having a thickness and an alloy composition, the method comprising the steps of:

a. determining a contact surface area of at least one electrode;
b. determining a contract pressure based on (i) the contact surface area, (ii) the thickness, and (iii) the alloy composition;
c. determining a current and a mechanical force to apply the contact pressure to the metal sheet;
d. advancing the least one electrode from a starting position toward the metal sheet until the at least one electrode contacts the metal sheet such that the mechanical force is substantially applied to the metal sheet;
e. applying the current through the at least one electrode to the metal sheet and terminating the current at the completion of a weld cycle;
f. retracting the at least one electrode to the starting position;
g. advancing the at least one electrode from the starting position toward the metal sheet until the at least one electrode contacts the metal sheet;
h. measuring a difference in a stroke dimension;
i. calculating a change in the contact surface area of the at least one electrode using a mathematical algorithm comprising:

$D_2$ to $D_1$ area ratio=$0.0977(\Delta X^2)+0.625(\Delta X)+1.0$ wherein $D_1$ is equal to a first diameter of an electrode tip of the at least one electrode, $D_2$ is equal to a second diameter of the electrode tip of the at least one electrode, $\Delta X$ is equal to the dimensional chance of the stroke dimension, and the at least one electrode has a 45 degree truncated electrode tip geometry; and
k. repeating steps c-i for subsequent weld cycles as required until the completion of the metal sheet welding, whereby either the current or the mechanical force or combinations thereof can be incrementally stepped between weld cycles to compensate for the decrease in the contact pressure that results from the increase contact surface area as the at least one electrode erodes during the weld cycle.

21. The method according to claim 20 wherein the increase of the mechanical force is proportional to the increase in contact surface area.

22. The method according to claim 20 wherein the contact pressure is maintained above a threshold pressure and within a preselected range of pressures.

* * * * *

UNITED STATES PATENT AND TRADEMARK OFFICE
CERTIFICATE OF CORRECTION

PATENT NO. : 7,432,466 B2  Page 1 of 1
APPLICATION NO. : 11/298216
DATED : October 7, 2008
INVENTOR(S) : Donald J. Spinella et al.

It is certified that error appears in the above-identified patent and that said Letters Patent is hereby corrected as shown below:

In column 5, line 3, after "welds", delete "where" and insert --were--.

In column 8, line 43, line 21 of Claim 1, after "dimensional", delete "chance" and insert --change--.

In column 10, lines 29 and 30, under section (i) of Claim 20, lines 8 and 9, after the first occurrence of "the", delete "dimensional chance of" and insert --difference in--.

In column 10, line 31, before "repeating", delete "k." and insert --j.--.

Signed and Sealed this

Twenty-fifth Day of November, 2008

JON W. DUDAS
*Director of the United States Patent and Trademark Office*